United States Defensive Publication [19] (H) [11] T988,009

Andrew [43] Nov. 6, 1979

[54] VINYL CHLORIDE POLYMERIZATION PROCESS

[75] Inventor: William E. Andrew, Hertford, England

[73] Assignee: Imperial Chemical Industries Limited, London, England

[21] Appl. No.: 5,024

[22] Filed: Jan. 19, 1979

Related U.S. Application Data

[63] Continuation of Ser. No. 576,575, May 12, 1975, abandoned.

[30] Foreign Application Priority Data

May 30, 1974 [GB] United Kingdom ..... 24073/74

[51] Int. Cl.[2] ..... C08F 2/26; C08F 2/20; C08F 14/06

[52] U.S. Cl. ..... 526/345; 526/202; 526/225

[57] ABSTRACT

Vinyl chloride is polymerized by suspension or homogenized dispersion polymerization using a free radical-yielding initiator in which 0.02% by weight, based on the weight of vinyl chloride, of at least one α-olefin having from 6 to 20 carbon atoms is added to the vinyl chloride either (a) prior to the start of polymerization in the case of homogenized dispersion polymerization, or (b) prior to the start of or during the polymerization, but in any event before the onset of autoacceleration in the case of suspension polymerization. The disclosed process avoids or reduces the tendency of the vinyl chloride to undergo autoacceleration during the polymerization.

Preferably the amount of α-olefin employed is 0.03% to 0.075% by weight, particularly 0.03% to 0.06% by weight. The α-olefin preferably contains 8 to 20 carbon atoms; suitable α-olefins include octene-1, nonene-1, decene-1, dodecene-1, tetradecene-1, hexadecene-1, octadecene-1, and eicosene-1.

9 Claims, No Sheet Drawing,

19 Pages Specification

The file of this unexamined application may be inspected and copies thereof may be purchased (849 O.G. 1221, Apr. 9, 1968).